United States Patent
Zeng (10) Patent No.: US 10,642,662 B2
(45) Date of Patent: May 5, 2020

(54) METHOD FOR APPLICATION ACTION SYNCHRONIZATION, TERMINAL DEVICE, AND STORAGE MEDIUM

(71) Applicant: Guangdong Oppo Mobile Telecommunications Corp., Ltd., Dongguan, Guangdong (CN)

(72) Inventor: Yuanqing Zeng, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/110,326

(22) Filed: Aug. 23, 2018

(65) Prior Publication Data

US 2018/0365081 A1 Dec. 20, 2018

Related U.S. Application Data

(63) Continuation of application No. PCT/CN2017/086531, filed on May 31, 2017.

(30) Foreign Application Priority Data

May 31, 2016 (CN) .......................... 2016 1 0380745

(51) Int. Cl.
| | |
|---|---|
| *G06F 9/52* | (2006.01) |
| *G06F 9/48* | (2006.01) |
| *G06F 11/30* | (2006.01) |
| *G06F 11/34* | (2006.01) |
| *G06F 9/445* | (2018.01) |

(52) U.S. Cl.
CPC ............ *G06F 9/52* (2013.01); *G06F 9/44505* (2013.01); *G06F 9/4843* (2013.01); *G06F 11/30* (2013.01); *G06F 11/34* (2013.01)

(58) Field of Classification Search
CPC ........ G06F 9/44505; G06F 9/52; G06F 11/34; G06F 11/30; G06F 9/4843
See application file for complete search history.

(56) References Cited

U.S. PATENT DOCUMENTS

| | | |
|---|---|---|
| 2009/0158299 A1 | 6/2009 | Carter |
| 2012/0260118 A1* | 10/2012 | Jiang ..................... G06F 9/4843 713/340 |

(Continued)

FOREIGN PATENT DOCUMENTS

| | | |
|---|---|---|
| CN | 1321296 A | 11/2001 |
| CN | 104272786 A | 1/2015 |

(Continued)

*Primary Examiner* — Charles E Anya
(74) *Attorney, Agent, or Firm* — Young Basile Hanlon & MacFarlane, P.C.

(57) ABSTRACT

A method for application synchronization, a terminal device, and a storage medium includes: a request for synchronizing actions of applications to the kernel space of the operating system is received, action categories of the applications are obtained and an action determination is carried out, according to action parameters of the applications, and results of the action categories and the action determination of the applications are sent to the kernel space, the actions of the applications to be synchronized to the kernel space are achieved, in which a basis for processing the task scheduling and system running core number/frequency is provided to the kernel space.

18 Claims, 4 Drawing Sheets

(56) References Cited

U.S. PATENT DOCUMENTS

| | | | |
|---|---|---|---|
| 2013/0024818 A1* | 1/2013 | Rainisto | G06F 3/0482 |
| | | | 715/838 |
| 2015/0161024 A1 | 6/2015 | Gupta et al. | |
| 2015/0169377 A1 | 6/2015 | Norton et al. | |
| 2015/0347181 A1 | 12/2015 | Myrick et al. | |
| 2016/0004569 A1* | 1/2016 | Kim | G06F 9/5027 |
| | | | 718/104 |
| 2016/0026507 A1 | 1/2016 | Muckle et al. | |

FOREIGN PATENT DOCUMENTS

| | | |
|---|---|---|
| CN | 104407965 A | 3/2015 |
| CN | 104679598 A | 6/2015 |
| CN | 105184166 A | 12/2015 |
| WO | 2010126416 A1 | 11/2010 |

\* cited by examiner

METHOD FOR APPLICATION ACTION SYNCHRONIZATION, TERMINAL DEVICE, AND STORAGE MEDIUM

CROSS-REFERENCE TO RELATED APPLICATION(S)

This application is a continuation of PCT Application No. PCT/CN2017/086531, filed on May 31, 2017, which claims priority to Chinese Application No. 201610380745.4, filed on May 31, 2016, the contents of both of which are hereby incorporated by reference in their entireties.

TECHNICAL FIELD

This disclosure relates generally to the technical filed of computers, and more particularly relates to a method for application action synchronization, a terminal device, and a storage medium.

BACKGROUND

In present operating systems, there are always two running spaces: a kernel space and a user space. The kernel space is mainly used to run core functions (time clock, task scheduling, and interrupt response) of each operating system, and different kinds of applications are mainly run in the user space. In a device with a human machine interaction interface, user experience would be affected directly by performances and actions (such as an interface refreshing, a sliding processing, a key-press processing, etc.) of foreground applications of the human and machine interaction and interface refreshing. Simultaneously, the user experience would also be affected by applications in charge of data processing in background.

SUMMARY

Implementations of the disclosure provide a method for application action synchronization, a terminal device, and a storage medium, which may achieve synchronizing the actions of the foreground, background application to the kernel space.

According to a first aspect of the implementations of the disclosure, a method for application action synchronization is provided, the method includes: receiving a request for synchronizing actions of foreground applications and/or background applications to a kernel space of the operating system, the request comprising action parameters of the foreground applications and/or background applications; obtaining action categories of the foreground applications and/or background applications and carrying out an action determination, according to the action parameters of the foreground applications and/or background applications; and sending results of the action categories and the action determination of the foreground applications and/or background applications to the kernel space.

According to another aspect of the implementations of the disclosure, a terminal device is provided, the terminal device includes at least one processor; and a computer readable storage, coupled to the at least one processor and storing at least one computer executable instruction thereon, which when executed by the at least one processor, cause the at least one processor to carry out actions, comprising: receiving a request for synchronizing actions of applications to a kernel space of the operating system, the request comprising action parameters of the applications; obtaining action categories of the applications and carrying out an action determination, according to the action parameters of the applications; and sending results of the action categories and the action determination of the applications to the kernel space.

According to an additional aspect of the implementations of the disclosure, a computer storage medium is provided, therein, the computer storage medium stores a program, the program may be executed to carry out a part of operations or all operations of the method described in the first aspect of the implementations of the present disclosure.

BRIEF DESCRIPTION OF THE DRAWINGS

In order to illustrate the technical solutions of the related art or the implementations of the present disclosure more clearly, the drawings used in the description of the implementations or the related art will be briefly described, it will be apparent that the drawings described in the following are implementations of the present disclosure, and it will be apparent to those skilled in the art that other drawings can be obtained from the drawings without any creative work.

DETAILED DESCRIPTION

Technical solutions in the implementations of the present disclosure will be described below clearly and completely in conjunction with the accompanying drawings in the implementations of the present disclosure. Obviously, the described implementations are some implementations of the present disclosure, not all of the implementations. On the basis of the implementations in the present disclosure, all other implementations obtained by a person skilled in the art without creative work should fall within the scope of protection of the present disclosure.

In present operating systems, actions of applications, such as foreground applications and background applications, would not be known by the kernel, thereby, running requirements of the foreground applications and background applications cannot be matched precisely when processing a task scheduling and system running core number/frequency, thus causing performance problems (such as programs response slowly, stuck, etc.) and power consume problems (such as the power consumes of background applications are too much, insignificant background applications are running continuously) are occurred.

To implement a method and an apparatus for application action synchronization, a terminal device, and a storage medium, a request for synchronizing actions of the foreground applications and/or background applications to the kernel space of the operating system is received, action categories of the foreground applications and background applications are obtained and an action determination is carried out, according to action parameters of the foreground applications and/or background applications, and results of the action categories and the action determination of the foreground applications and/or background applications are sent to the kernel space, the actions of the foreground, background applications to be synchronized to the kernel space would be achieved, thereby a basis for processing the task scheduling and system running core number/frequency is provided to the kernel space.

The foreground applications illustrated in the implementations of the present disclosure usually are run in the user space of the operating system, the foreground applications are those application relative to background applications, the foreground applications and background applications are applications running in the system currently, and applications displayed to the user and capable of being operated by the user currently are the foreground applications, the background applications are run in the background of the system. For example, a mobile terminal currently displays an application interface of a "Wechat®" application and runs a map application in the background simultaneously, therefore, the "Wechat®" application is the foreground application and the map application is the background application. In other explanations, the foreground applications are applications running in foreground of the terminal device, and the background applications are applications running in background of the terminal device.

Figure 1:
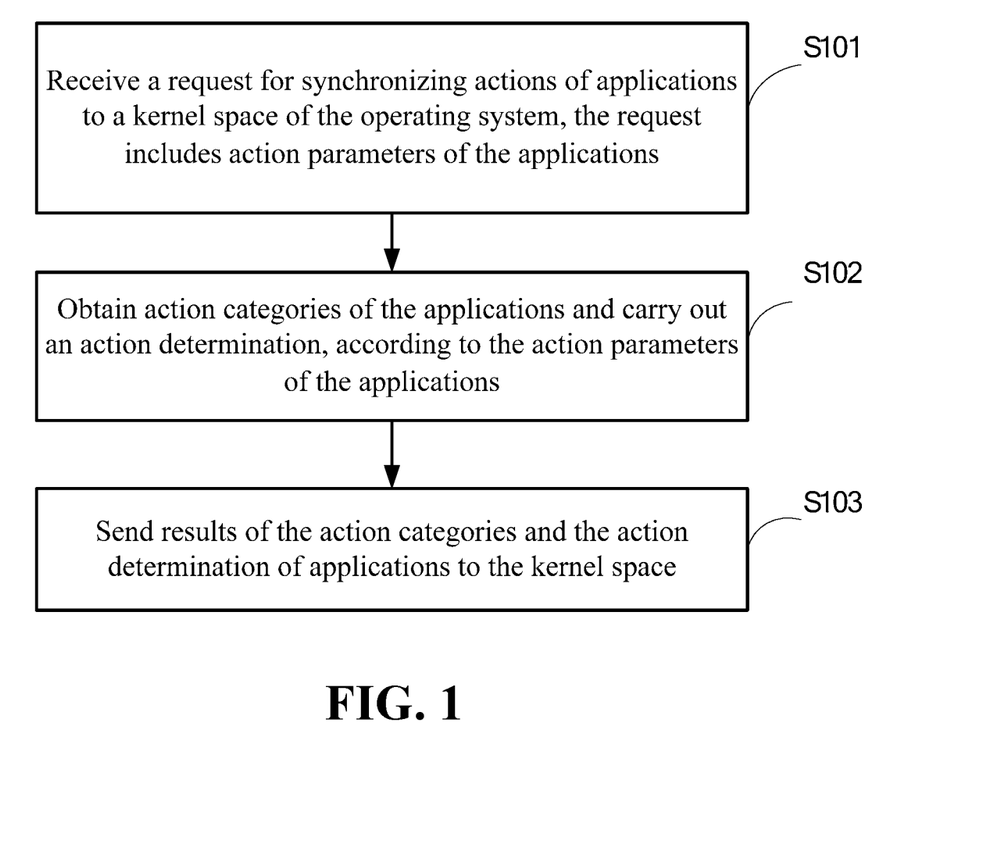
FIG. 1 is a schematic flowchart of a method for application action synchronization provided by implementations of the disclosure.

FIG. 1 is a schematic flow chart of a method for application action synchronization provided by an implementation of the present disclosure. The method includes following operations:

At block S101, a request for synchronizing actions of applications to a kernel space of the operating system is received, the request includes action parameters of the foreground applications and/or background applications.

In some implementations, the applications may include foreground applications and/or background applications, namely, the applications may include at least one of the foreground applications and the background applications. In the present disclosure, the applications are illustrated as the foreground applications and/or background applications for example. Throughout the specification, the applications, the foreground applications and/or background applications may be considered as the same object.

The actions of the foreground applications and background applications of the user space usually are classified to: open-loop actions and close-loop actions. In detail:

A. Open-Loop Action.

For this action category, in software codes, there is no corresponding definite stop action, thereby an action prediction running time corresponding to the open-loop action is required, which will be sent to the kernel. The open-loop action usually has a fixed expiration time, the action is stopped automatically when an action execution time exceeds the expiration time. For example, the expiration time of a sliding operation action is 300 milliseconds, the user does not need to provide a signal for stopping the action, and the sliding operation action is stopped automatically when it has been triggered for more than 300 milliseconds.

The open-loop action may include an application launch action, a wake-up action, an animated picture switching action, a sliding operation action, a software download action, and other actions.

B. Close-Loop Action.

The close-loop action includes those actions whose certain action time cannot be predicated, for example, when installing a software, how long the software can be installed completely is not known. For this action category, in the software codes, there is a definite stop action to correspond, therefore, there is no necessary to send the action time. Although a certain stop time of the close-loop action is not known, it is also needed to provide a longest expiration time to prevent the close-loop action from being incapable of stopping due to accident. Take the software installation action as example, a default longest expiration time is 5000 milliseconds, if canceling the action is not occurred within 5000 milliseconds, the action would be stopped automatically. If an operation of canceling the action is generated on one's own initiative within 5000 milliseconds, the action would be stopped immediately.

The close-loop action may include a software installation action, a software video capturing action, a photographing action, a video encoding action, a preview action, a video playback action, an audio playback action, an input and output action, and other actions.

The foreground application and the background application of the user space send the request for synchronizing their actions to the kernel space of the operating system, namely synchronize their actions to the kernel space. In the implementation, the synchronization of actions is controlled uniformly, and action synchronization requests of each foreground application and each background application are received or obtained. The request includes action parameters of the foreground applications and background applications, correspond to the open-loop action and the close-loop action, the action parameters include a preset expiration time, a stopping action, and a maximum value of the expiration time.

At block S102, action categories of the foreground applications and/or background applications are obtained, and an action determination is carried out, according to the action parameters of the foreground applications and/or background applications.

Based on the action parameters of the foreground applications and background applications, the action categories of the foreground applications and background applications may be analyzed and the action determination may be carried out. For example, if the action parameters include a preset expiration time, then the action may be determined as the open-loop action, and then determining whether the action time exceeds to the preset expiration time, if yes, then the action may be determined as already be stopped, and then action determination results are obtained.

At block S103, results of the action categories and the action determination of the foreground applications and/or background applications are sent to the kernel space.

By sending the analyzed results of the action categories and the action determination of the foreground applications and background applications to the kernel space, thereby a basis for processing the task scheduling and system running core number/frequency is provided to the kernel space, thus enabling the kernel to match the run requirement of the foreground applications and the background applications precisely, and the performance problems (such as programs response slowly, stuck, etc.) and power consume problems (such as the power consume of background applications are too much, insignificant background application are running continuously) will not be leaded to occur.

According to the method for application action synchronization provided by the implementations of the present disclosure, the actions of the foreground applications and the background applications to be synchronized to the kernel space can be achieved by receiving the request for synchronizing actions of foreground applications and/or background applications to a kernel space of the operating system, obtaining the action categories of the foreground applications and/or background applications and executing the action determination according to the action parameters of the foreground applications and/or background applications, and sending the results of the action categories and the action determination of the foreground applications and/or background applications to the kernel space. Thereby providing the basis for the kernel space to process the task scheduling and system running core number/frequency.

Figure 2:
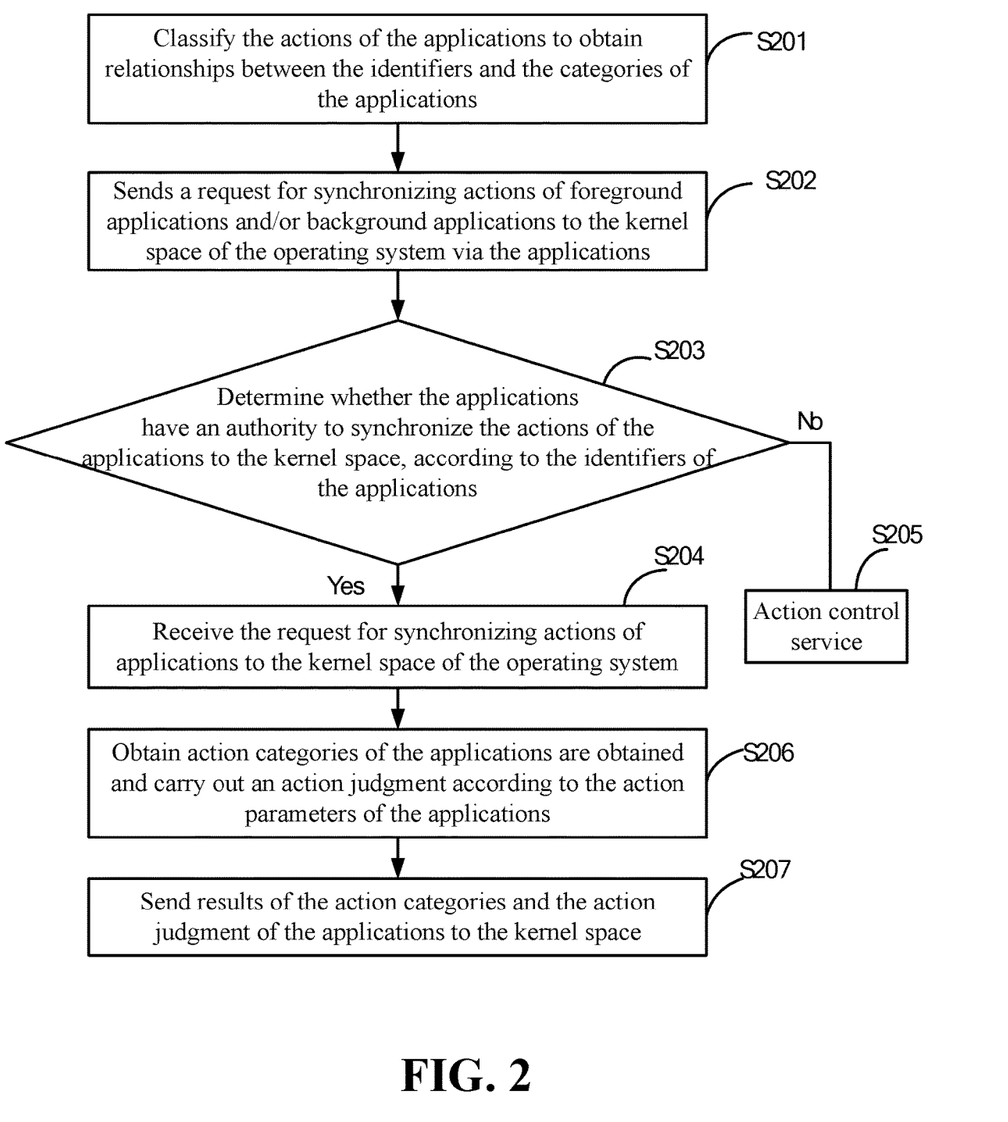
FIG. 2 is a schematic flowchart of another method for application action synchronization provided by implementations of the disclosure.

FIG. 2 is a schematic flow chart of another method for application action synchronization provided by an implementation of the present disclosure. The method includes following operations:

At block S201, the actions of the foreground applications and/or background applications of the user space usually are classified to obtain relationships between identifiers and categories of a number of foreground applications and/or background applications. Namely, the relationships between identifiers and categories are obtained.

In the implementation, the actions, of the foreground applications and background applications, that are needed to notify the kernel space may be classified to the following categories (but not limited to the following categories):

ACTION_NONE action interrupt;
ACTION_LAUNCH Application launch;
ACTION_ANIMATION animated picture switching;
ACTION_SCROLLING sliding operation;
ACTION_INSTALLATION software installation;
ACTION_DOWNLOAD software download;
ACTION_SNAPSHOT photography;
ACTION_PREVIEW preview;
ACTION_VIDEO_ENCODING video encoding;
ACTION_AUDIO_PLAYBACK audio playback;
ACTION_VIDEO_PLAYBACK video playback;
ACTION_IO input and output operation; file system access, data base access;
ACTION_IDLE idle operation;
ACTION_RESUME wake-up action.

The actions of the foreground applications and/or background applications of the user space usually are classified to obtain relationships between identifiers and categories of the number of foreground applications and/or background applications. The action categories include the open-loop action and the close-loop action. For example, the open-loop action may include an application launch action, a wake-up action, an animated picture switching action, a sliding operation action, a software download action, and other actions; the close-loop action may include a software installation action, a software video capturing action, a photographing action, a video encoding action, a preview action, a video playback action, an audio playback action, an input and output action, and other actions.

At block S202, a request for synchronizing actions of foreground applications and/or background applications is sent to the kernel space of the operating system by the foreground applications and/or background applications.

Any foreground application, background application of the user space may send the request for synchronizing the action of the application itself to the kernel space of the operating system, the request includes the identifier and the action parameter of the any foreground application, background application.

At block 203, whether the foreground applications and/or the background applications have an authority to synchronize the actions of the foreground applications and/or the background applications to the kernel space is determined, according to the identifiers of the foreground applications and/or the background applications. when the foreground applications and/or the background applications have the authority to synchronize the actions of the foreground applications and/or the background applications to the kernel space, turn to block S204; when the foreground applications and/or the background applications do not have the authority to synchronize the actions of the foreground applications and/or the background applications to the kernel space, turn to block S205.

To uniformly set the authority about whether the foreground applications and/or the background applications capable of synchronizing the actions, the authority may be queried according to the identifier of the application. For example, whether the application has the authority to synchronize its actions to the kernel space may be determined according to at least one of: whether the application is valid, and whether the action parameter is reasonable, etc.

At block S204, the request for synchronizing actions of foreground applications and/or background applications to the kernel space of the operating system is received.

If the application has the authority to synchronize the actions, then the request of synchronization is received directly.

At block S205, an action control service is carried out, namely: the request for synchronizing actions of foreground applications and/or background applications to the kernel space of the operating system is received via an action control service interface.

At block S206, action categories of the foreground applications and/or background applications are obtained and an action determination is carried, according to the action parameters of the foreground applications and/or background applications.

Based on the action parameters of the foreground applications and background applications, the action categories of the foreground applications and background applications may be analyzed and the action determination may be carried out. For example, if the action parameters include preset expiration time, then the action may be determined as the open-loop action, and then determining whether the action time exceeds to the preset expiration time, if yes, then the action may be determined as already be stopped, and then the results of the action determination are obtained.

At block S207, results of the action categories and the action determination of the foreground applications and/or background applications are sent to the kernel space.

By sending the analyzed results of the action categories and the action determination of the foreground applications and background applications to the kernel space, thereby a basis for processing the task scheduling and system running core number/frequency is provided to the kernel space, thus enabling the kernel to match the run requirement of the foreground applications and the background applications precisely, and the performance problems (such as programs response slowly, stuck, etc.) and power consume problems (such as the power consume of background applications are too much, insignificant background application are running continuously) will not be leaded to occur.

According to the method for application action synchronization provided by the implementations of the present disclosure, the actions of the foreground applications and the background applications to be synchronized to the kernel space can be achieved by receiving the request for synchronizing actions of foreground applications and/or background applications to a kernel space of the operating system, obtaining the action categories of the foreground applications and/or background applications and executing the action determination according to the action parameters of the foreground applications and/or background applications, and sending the results of the action categories and the action determination of the foreground applications and/or background applications to the kernel space. Thereby providing the basis for the kernel space to process the task scheduling and system running core number/frequency.

It is to be noted that, for the sake of simplicity, the foregoing method implementations are described as a series of action combinations, however, it will be appreciated by those skilled in the art that the present disclosure is not limited by the sequence of actions described. According to the present disclosure, some steps or operations may be performed in other order or simultaneously. Besides, it will be appreciated by those skilled in the art that the implementations described in the specification are exemplary implementations and the actions and modules involved are not necessarily essential to the present disclosure.

Figure 3:
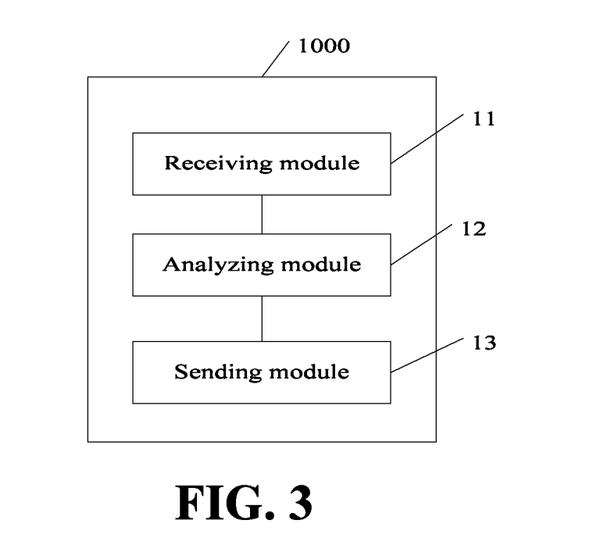
FIG. 3 is a structure schematic diagram of an apparatus for application action synchronization provided by implementations of the disclosure.

FIG. 3 is a structure schematic diagram of an apparatus for application action synchronization provided by implementations of the disclosure. The apparatus for application action synchronization 1000 includes a receiving module 11, an analyzing module 12, and a sending module 13. In detail, the receiving module 11 is configured to receive a request for synchronizing actions of foreground applications and/or background applications to a kernel space of the operating system, the request includes action parameters of the foreground applications and/or background applications.

The actions of the foreground applications and background applications of the user space usually are classified to: open-loop actions and close-loop actions.

A. Open-Loop Action.

For this action category, in software codes, there is no corresponding definite stop action, thereby it must exist an action prediction running time corresponding to the open-loop action and being sent to the kernel. The open-loop action usually has a fixed expiration time, the action is stopped automatically when an action execution time is exceeded to the expiration time. For example, the expiration time of a sliding operation action is 300 milliseconds, the user does not need to provide a signal of stopping the action, and the sliding operation action is stopped automatically when it has been triggered for more than 300 milliseconds.

The open-loop action may include an application launch action, a wake-up action, an animated picture switching action, a sliding operation action, a software download action, and other actions.

B. Close-Loop Action.

The close-loop action includes those actions whose certain action time cannot be predicated, for example, when installing a software, how long the software can be installed completely is not known. For this action category, in the software codes, there is a definite stop action to correspond, therefore, there is no necessary to send the action time. Although the certain stop time of the close-loop action is not known, it is also needed to provide a longest expiration time to prevent the close-loop action from being incapable of stopping due to accident. Take the software installation action as example, a default longest expiration time is 5000 milliseconds, if canceling the action is not occurred within 5000 milliseconds, the action would be stopped automatically. If an operation of canceling the action is generated on one's own initiative within 5000 milliseconds, the action would be stopped immediately.

The close-loop action may include a software installation action, a software video capturing action, a photographing action, a video encoding action, a preview action, a video playback action, an audio playback action, an input and output action, and other actions.

The foreground application and the background application of the user space send the request for synchronizing their actions to the kernel space of the operating system, namely synchronize their actions to the kernel space. In the implementation, the synchronization of actions is controlled uniformly, and action synchronization requests of each foreground application and each background application are received or obtained. The request includes action parameters of the foreground applications and background applications, correspond to the open-loop action and the close-loop action, the action parameters include a preset expiration time, a stopping action, and a maximum value of the expiration time.

The analyzing module 12 is configured to obtain action categories of the foreground applications and/or background applications and carry out an action determination, according to the action parameters of the foreground applications and/or background applications.

Based on the action parameters of the foreground applications and background applications, the action categories of the foreground applications and background applications may be analyzed and the action determination may be executed. For example, if the action parameters include a preset expiration time, then the action may be determined as the open-loop action, and then determining whether the action time exceeds to the preset expiration time, if yes, then the action may be determined as already be stopped, and then action determination results are obtained.

The sending module 13 is configured to send results of the action categories and the action determination of the foreground applications and/or background applications the kernel space.

By sending the analyzed results of the action categories and the action determination of the foreground applications and background applications to the kernel space, thereby a basis for processing the task scheduling and system running core number/frequency is provided to the kernel space, thus enabling the kernel to match the run requirement of the foreground applications and the background applications precisely, and the performance problems (such as programs response slowly, stuck, etc) and power consume problems (such as the power consume of background applications are too much, insignificant background application are running continuously) will not be leaded to occur.

According to the apparatus for application action synchronization provided by the implementations of the present disclosure, the actions of the foreground applications and the background applications to be synchronized to the kernel space can be achieved by receiving the request for synchronizing actions of foreground applications and/or background applications to a kernel space of the operating system, obtaining the action categories of the foreground applications and/or background applications and executing the action determination according to the action parameters of the foreground applications and/or background applications, and sending the results of the action categories and the action determination of the foreground applications and/or background applications to the kernel space. Thereby providing the basis for the kernel space to process the task scheduling and system running core number/frequency.

Figure 4:
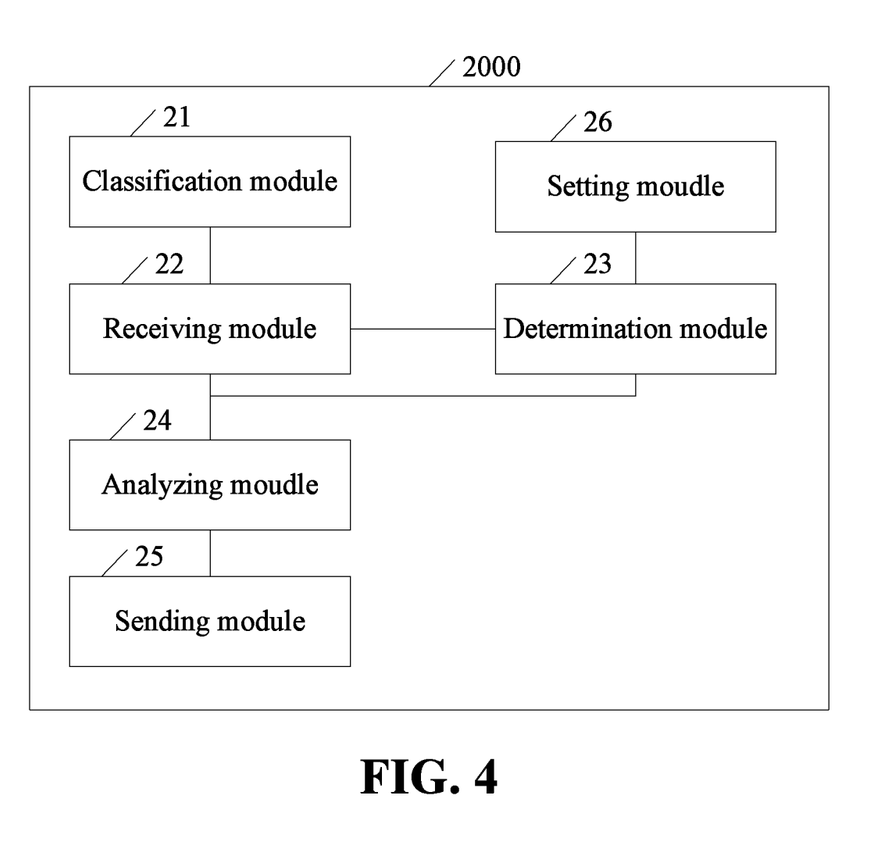
FIG. 4 is a structure schematic diagram of another apparatus for application action synchronization provided by implementations of the disclosure.

FIG. 4 is a structure schematic diagram of another apparatus for application action synchronization provided by implementations of the disclosure. The apparatus for application action synchronization 2000 includes: a classification module 21, a receiving module 22, a determination module 23, an analyzing module 24, a setting module 26, and a sending module 25. In detail: the classification module 21 is configured to classify actions of the foreground applications and/or background applications of the user space to obtain relationships between identifiers and categories of a number of foreground applications and/or background applications.

In the implementation, the actions, of the foreground applications and background applications, that are needed to notify the kernel space may be classified to the following categories (but not limited to the following categories):

ACTION_NONE action interrupt;
ACTION_LAUNCH Application launch;
ACTION_ANIMATION animated picture switching;
ACTION_SCROLLING sliding operation;
ACTION_INSTALLATION software installation;
ACTION_DOWNLOAD software download;
ACTION_SNAPSHOT photography;
ACTION_PREVIEW preview;
ACTION_VIDEO_ENCODING video encoding;
ACTION_AUDIO_PLAYBACK audio playback;
ACTION_VIDEO_PLAYBACK video playback;
ACTION_IO input and output operation; file system access, data base access;
ACTION_IDLE idle operation;
ACTION_RESUME wake-up action.

The actions of the foreground applications and/or background applications of the user space usually are classified to obtain relationships between identifiers and categories of the number of foreground applications and/or background applications. The action categories include the open-loop action and the close-loop action. For example, the open-loop action may include an application launch action, a wake-up action, an animated picture switching action, a sliding operation action, a software download action, and other actions; the close-loop action may include a software installation action, a software video capturing action, a photographing action, a video encoding action, a preview action, a video playback action, an audio playback action, an input and output action, and other actions.

Any foreground application, background application of the user space may send the request for synchronizing the action of the application itself to the kernel space of the operating system, the request include the identifier and the action parameter of the any foreground application, background application.

The determination module 23 is configured to determine whether the foreground applications and/or the background applications have an authority to synchronize the actions of the foreground applications and/or the background applications to the kernel space.

The setting module 26 is configured to set the authority under which the foreground applications and/or the background applications synchronize the actions of the foreground applications and/or the background applications to the kernel space.

The setting module 26 is detail configured to set the authority under which the foreground applications and/or the background applications synchronize the actions of the foreground applications and/or the background applications to the kernel space when the foreground applications and/or the background applications are valid.

To uniformly set the authority about whether the foreground applications and/or the background applications capable of synchronizing the actions, the authority may be queried according to the identifier of the application. For example, whether the application with the authority to synchronize its actions to the kernel space may be determined according to at least one of: whether the application is valid, and whether the action parameter is reasonable, etc.

The receiving module 22 is configured to receive the request for synchronizing actions of foreground applications and/or background applications to the kernel space of the operating system when a result of the determination module 23 is yes.

If the application has the authority to synchronize the actions, then the request of synchronization is received directly.

The receiving module 22 is further configured to receive the request for synchronizing actions of foreground applications and/or background applications to the kernel space of the operating system via an action control service interface when the determination result of the determination module 23 is not.

If the application without the authority of synchronizing the actions, then the request for synchronizing actions may be received via the action control service interface, because the action control service is registered as the system service, the action control service can provide interface for the applications without the authority, of the user space, to receive their synchronizing requests.

The analyzing module 24 is configured to obtain action categories of the foreground applications and/or background applications and carry out an action determination, according to the action parameters of the foreground applications and/or background applications.

Based on the action parameters of the foreground applications and background applications, the action categories of the foreground applications and background applications may be analyzed and the action determination may be carried out. For example, if the action parameters include preset expiration time, then the action may be determined as the open-loop action, and then determining whether the action time exceeds to the preset expiration time, if yes, then the action may be determined as already be stopped, and then the results of the action determination are obtained.

The sending module 25 is configured to send results of the action categories and the action determination of the foreground applications and/or background applications to the kernel space.

By sending the analyzed results of the action categories and the action determination of the foreground applications and background applications to the kernel space, thereby a basis for processing the task scheduling and system running core number/frequency is provided to the kernel space, thus enabling the kernel to match the run requirement of the foreground applications and the background applications precisely, and the performance problems (such as programs response slowly, stuck, etc.) and power consume problems (such as the power consume of background applications are too much, insignificant background application are running continuously) will not be leaded to occur.

According to the apparatus for application action synchronization provided by the implementations of the present disclosure, the synchronization that the actions of the foreground applications and the background applications to the kernel space can be achieved by receiving the request for synchronizing actions of foreground applications and/or background applications to a kernel space of the operating system, obtaining the action categories of the foreground applications and/or background applications and executing the action determination according to the action parameters of the foreground applications and/or background applications, and sending the results of the action categories and the action determination of the foreground applications and/or background applications to the kernel space. Thereby providing the basis for the kernel space to process the task scheduling and system running core number/frequency.

Figure 5:
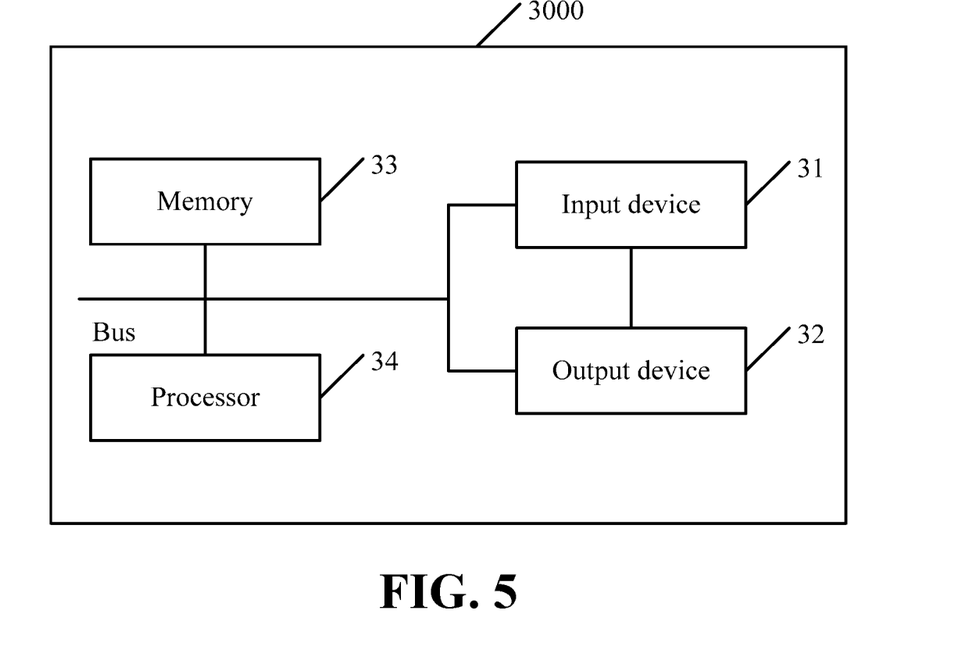
FIG. 5 is a structure schematic diagram of a terminal device provided by implementations of the disclosure.

FIG. 5 is a structure schematic diagram of a terminal device provided by implementations of the present disclosure. As illustrated in FIG. 5, the terminal device 3000 may include an input device 31, an output device 32, a memory 33 and a processor 34 (a number of the processor 34 may be one or more, in FIG. 5, one processor is taken as example). In some implementations of the present disclosure, the input device 31, the output device 32, the memory 33 and the processor 34 may be coupled to each other via buses or other modes. FIG. 5 illustrates an example in which these components are coupled via the bus.

The memory 33 is configured to store instructions and is coupled to the processor.

The processor is configured to execute the instructions to carry out actions, comprising: receiving a request for synchronizing actions of foreground applications and/or background applications to a kernel space of the operating system, the request includes action parameters of the foreground applications and/or background applications; obtaining action categories of the foreground applications and/or background applications and carrying out an action determination according to the action parameters of the foreground applications and/or background applications; sending results of the action categories and the action determination of the foreground applications and/or background applications to the kernel space.

Alternatively, the request further includes identifiers of the foreground applications and/or background applications.

The processor 34 is further configured to: determine whether the foreground applications and/or the background applications have an authority to synchronize the actions of the foreground applications and/or the background applications to the kernel space according to the identifiers of the foreground applications and/or the background applications; carry out the operation of receiving the request for synchronizing actions of foreground applications and/or background applications to the kernel space of the operating system based on a determination that the foreground applications and/or the background applications have the authority to synchronize the actions of the foreground applications and/or the background applications to the kernel space; and receive the request for synchronizing actions of foreground applications and/or background applications to the kernel space of the operating system via an action control service interface based on a determination that the foreground applications and/or the background applications do not have the authority to synchronize the actions of the foreground applications and/or the background applications to the kernel space.

Alternatively, the processor 34 is further configured to: classify the actions of the foreground applications and/or background applications of the user space to obtain relationships between identifiers and categories of a number of foreground applications and/or background applications.

Alternatively, action categories of the foreground applications and background applications may include open-loop actions and close-loop actions.

Alternatively, the action parameters may include at least one selected from: a preset expiration time, a stopping action, and a maximum value of the expiration time According to the terminal device provided by the implementations of the present disclosure, the actions of the foreground applications and the background applications to be synchronized to the kernel space can be achieved by receiving the request for synchronizing actions of foreground applications and/or background applications to a kernel space of the operating system, obtaining the action categories of the foreground applications and/or background applications and carrying out the action determination according to the action parameters of the foreground applications and/or background applications, and sending the results of the action categories and the action determination of the foreground applications and/or background applications to the kernel space. Thereby providing the basis for the kernel space to process the task scheduling and system running core number/frequency.

In the foregoing implementations, the description of each implementation has its own emphasis. For the parts not described in detail in one implementation, reference may be made to related descriptions in other implementations.

According to the description of the foregoing implementations, those skilled in the art may understand that present disclosure may be achieved via hardware, or firmware, or the combination of them. When being achieved via software, the above functions may be stored in a computer-readable medium or be taken as one or more instructions or codes to be transmitted, of the computer-readable medium. The computer-readable medium may include a computer storage medium and a communication medium, therein the communication medium includes any mediums facilitating to transmit computer program from one place to another place. The storage medium may be any available mediums that can be accessed by the computer. Take this as an example but is not limited to: the computer-readable medium may include a random access memory (RAM), a read-only memory (ROM), an electrically erasable programmable read-only memory (EEPROM), a compact disc read-only memory (CD-ROM) or other compact disc storage mediums, disk storage mediums, or other magnetic storage devices, or any medium capable of being accessed by the computer and carrying or storing target program codes with a form of instructions or data structure. Besides, any connection may be properly used as the computer-readable medium. For example, if the software is transmitted from a network station, a server, or other remote source by using a coaxial-cable, an optical fiber cable, a twisted-pair, a digital subscriber line (DSL) or by using wireless technology such as infrared, wireless, and microwave, then the coaxial-cable, the optical fiber cable, the twisted-pair, the DSL or the wireless technology such as infrared, wireless, and microwave would be contained in the definition of the medium. As used in the present disclosure, the disk and disc may include compact discs, laser discs, discs, digital video disks (DVDs), floppy disks, and Blue-ray Discs. The disks usually copy data in a magnetic mode, while the discs usually copy data in an optical mode by using laser. The combination of them described above also should be contained in the protection range of the computer-readable medium.

In one implementation, a non-transitory computer-readable storage medium is provided, the non-transitory computer-readable storage medium store a computer program which, when executed by a processor, causes the processor to carry out actions of any one of the above method for application action synchronization. The non-transitory computer-readable storage medium can be any one of computer-readable mediums described above.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for application action synchronization for application action synchronization, comprising:
   receiving a request for synchronizing actions of applications to a kernel space of an operating system, the request comprising action parameters of the applications, wherein the request comprises identifiers of the applications;
   obtaining action categories of the applications and carrying out an action determination, according to the action parameters of the applications;
   sending results of the action categories and the action determination of the applications to the kernel space;
   determining whether the applications have an authority to synchronize the actions of the applications to the kernel space according to the identifiers of the applications;
   receiving the request for synchronizing the actions of the applications to the kernel space of the operating system based on a determination that the applications have the authority to synchronize the actions of the applications to the kernel space; and
   receiving the request for synchronizing the actions of the applications to the kernel space of the operating system via an action control service interface based on a determination that the applications do not have the authority to synchronize the actions of the applications to the kernel space.

2. The method of claim 1, further comprising:
   setting the authority under which the applications synchronize the actions of the applications to the kernel space.

3. The method of claim 2, wherein setting the authority under which the applications synchronize the actions of the applications to the kernel space comprises:
   setting the authority under which the applications synchronize the actions of the applications to the kernel space, when the applications are valid.

4. The method of claim 2, wherein setting the authority under which the applications synchronize the actions of the applications to the kernel space comprises:
   setting the authority under which the applications synchronize the actions of the applications to the kernel space, when the action parameters of the applications are reasonable.

5. The method of claim 1, further comprising:
   classifying the actions of the applications and obtaining relationships between the identifiers and the action categories of the applications.

6. The method of claim 5, wherein the action categories of the applications comprise an open-loop action and a close-loop action.

7. The method of claim 1, wherein the action parameters comprises at least one of: a preset expiration time, a stopping action, and a maximum value of the preset expiration time.

8. The method of claim 1, wherein the applications comprise at least one selected from foreground applications and background applications.

9. The method of claim 8, wherein the foreground applications are applications running in foreground of a terminal device, and the background applications are applications running in background of the terminal device.

10. A terminal device, comprising:
    at least one processor; and
    a computer readable storage, coupled to the at least one processor and storing at least one computer executable instruction thereon, which when executed by the at least one processor, cause the at least one processor to:
       receive a request for synchronizing actions of applications to a kernel space of an operating system, the request comprising action parameters of the applications, wherein the request comprises identifiers the applications;
       obtain action categories of the applications and carry out an action determination, according to the action parameters of the applications;
       send results of the action categories and the action determination of the applications to the kernel space
       determine whether the applications have an authority to synchronize the actions of the applications to the kernel space, according to the identifiers of the applications;
       receive the request for synchronizing the actions of applications to the kernel space of the operating system based on a determination that the applications have the authority to synchronize the actions of the applications to the kernel space; and
       receive the request for synchronizing the actions of the applications to the kernel space of the operating system via an action control service interface based on a determination that the applications do not have the authority to synchronize the actions of the applications to the kernel space.

11. The terminal device of claim 10, wherein the at least one processor is further caused to:
    set the authority under which the applications synchronize the actions of the applications to the kernel space.

12. The terminal device of claim 11, wherein the at least one processor caused to set the authority under which the applications synchronize the actions of the applications to the kernel space is caused to:
    set the authority under which the applications synchronize the actions of the applications to the kernel space, when the applications are valid.

13. The terminal device of claim 11, wherein the at least one processor caused to set the authority under which the applications synchronize the actions of the applications to the kernel space is caused to:
    set the authority under which the applications synchronize the actions of the applications to the kernel space, when the action parameters of the applications are reasonable.

14. The terminal device of claim 10, wherein the at least one processor is further caused to:
    classify the actions of the applications and obtain relationships between the identifiers and the action categories of the applications.

15. The terminal device of claim 14, wherein the action categories of the applications comprise an open-loop action and a close-loop action.

16. The terminal device of claim 10, wherein the action parameters comprises at least one of: a preset expiration time, a stopping action, and a maximum value of the preset expiration time.

17. The terminal device of claim 10, wherein the applications comprise at least one selected from foreground applications and background applications, wherein the foreground applications are applications running in foreground of a terminal device, and the background applications are applications running in background of the terminal device.

18. A non-transitory computer-readable storage medium storing a computer program which, when executed by a processor, causes the processor to:
- receive a request for synchronizing actions of applications to a kernel space of an operating system, the request comprising action parameters of the applications, wherein the request comprises identifiers of the applications;
- obtain action categories of the applications and carry out an action determination, according to the action parameters of the applications;
- send results of the action categories and the action determination of the applications to the kernel space
- determine whether the applications have an authority to synchronize the actions of the applications to the kernel space, according to the identifiers of the applications;
- receive the request for synchronizing the actions of applications to the kernel space of the operating system based on a determination that the applications have the authority to synchronize the actions of the applications to the kernel space; and
- receive the request for synchronizing the actions of the applications to the kernel space of the operating system via an action control service interface based on a determination that the applications do not have the authority to synchronize the actions of the applications to the kernel space.

\* \* \* \* \*